United States Patent Office

3,576,750
Patented Apr. 27, 1971

3,576,750
COMPOSITIONS FOR POLISHING ACRYLIC MATERIALS
Joseph C. Muhler, Indianapolis, Ind., assignor to Indiana University Foundation, Bloomington, Ind.
No Drawing. Continuation-in-part of application Ser. No. 796,582, Feb. 4, 1969. This application Apr. 30, 1969, Ser. No. 820,607
Int. Cl. C11d 3/12, 7/10
U.S. Cl. 252—140
8 Claims

ABSTRACT OF THE DISCLOSURE

Improved acrylic polishing preparations employ a major amount of zirconium silicate ($ZrSiO_4$) and minor amounts of micronized zirconium dioxide ($ZrO_2$) and zirconium oxychloride ($ZrOCl_2 \cdot 8H_2O$). Such preparations are especially useful in denture cleanser compositions and in other agents useful in cleaning and polishing acrylic resin materials and the like.

CROSS REFERENCE

This is a continuation-in-part of applicant's co-pending United States application entitled Denture Cleanser Preparation Comprising Zirconium Silicate and Zirconium Dioxide, Ser. No. 796,582, filed Feb. 4, 1969.

BACKGROUND OF THE INVENTION

Field of the invention

The present invention relates to acrylic polishing agents comprising a major amount of zirconium silicate ($ZrSiO_4$) and minor amounts of micronized zirconium dioxide ($ZrO_2$) and zirconium oxychloride ($ZrOCl_2 \cdot 8H_2O$) and to the formulation and utilization of preparations incorporating such polishing agents. In particular, the invention relates to denture polishing compositions comprising such polishing agents.

Description of the prior art

The difficulty of achieving good oral hygiene has been shown to be no less difficult in individuals using dentures than in individuals having their natural teeth. Dental research has shown that complete and partial dentures are very susceptible to the formation and accumulation of calculus. In addition, the methyl methacrylate resin portion of dentures and the areas around the neck of the prosthetic teeth are very vulnerable to the formation and accumulation of various stains. Any portion of the denture may be stained by a variety of common agents normally ingested in the human diet. For example, staining on dentures commonly results from the use of tobacco, coffee, tea, certain fruit juices, and some jellies and jams, as well as other types of food.

Experience has shown that many of the foregoing stains are extremely difficult, if not impossible, to remove from the acrylic dentures with the various denture cleansers commercially available at the present time. Moreover, even though extended brushing may sometimes remove the accumulated stains and calculus, the commercial denture cleansers are all found to be deficient in other important respects. For example, many such cleansers leave the surface of the denture with a dull, unpolished finish which promotes the rapid formation of additional stains and films. A highly polished, smooth surface is desirable in that it reduces the susceptibility of the surface to the formation and/or accumulation of calculus, stains, and denture induced mouth odors.

In addition, some preparations commonly used for cleaning dentures are excessively abrasive and scratch material from which the denture is made, typically an acrylic resin such as methyl methacrylate. Since the vast majority of denture wearers use a method of brushing, or a combination of brushing and immersion in order to clean their dentures, an abrasive used in combination with a denture cleanser must be carefully chosen and manufactured to maximize the cleaning and polishing properties of the composition and, at the same time, minimize the abrasion of the denture produced by brushing therewith.

Many of the same problems are posed in industrial applications of acrylic polishing agents. The provision of a polishing composition suitable for finishing acrylic resin coatings and the like require excellent polishing capabilities without abrasion.

In the Ser. No. 796,582 application of which this application is a continuation-in-part, there is disclosed a substantially improved denture cleaning and polishing system comprising as its principal components zirconium silicate ($ZrSiO_4$) and zirconium dioxide ($ZrO_2$). In accordance with this invention, it has been found that the polishing capabilities of the compositions of the Ser. No. 796,582 application may be improved still further by the incorporation therein of a minor amount of zirconium oxychloride ($ZrOCl_2 \cdot 8H_2O$).

Accordingly, it is a primary object of the present invention to produce an improved acrylic polishing composition.

It is another object of the present invention to produce a polishing composition which polishes acrylic materials with a minimum of abrasion.

It is another primary object of the present invention to provide a denture cleanser composition incorporating an agent of the character described.

Zirconium silicate has, of course, been used in the past as an industrial polishing agent for glass. U.S. Pat. No. 2,427,799 (Maloney—Sept. 23, 1947), describes a zirconium silicate preparation for polishing glass in which at least 90% of the particles used in the preparation have a fineness of two microns or less in diameter. More recently, U.S. Pat. No. 2,694,004 (Coffeen—Nov. 9, 1954), describes a preferred zirconium silicate polishing material in which substantially all particles are essentially in the range of up to about three microns. Although Maloney and Coffeen describe zirconium silicate glass polishing agents, they do not suggest that their compositions may be used as polishing agents for softer acrylic resin materials such as methyl methacrylate, which would be much more susceptible to abrasion than glass.

Cooley et al. U.S. Pat. No. 3,151,210 describe dentifrice abrasives embodying $ZrSiO_4$ for use on natural teeth. Cooley et al., however, were able to achieve their objectives only by providing a thermo-plastic resin coating on the $ZrSiO_4$. The coating taught by Cooley et al. so alters the $ZrSiO_4$ that it must be emphasized that the $ZrSiO_4$ of the present invention is uncoated and acts directly on the denture surface without interposition of a plastic coating.

SUMMARY OF THE INVENTION

In accordance with the present invention, it has been found that improved compositions for polishing acrylic resin and other similar materials comprise a major amount of zirconium silicate ($ZrSiO_4$) and minor amounts of micronized zirconium dioxide ($ZrO_2$) and zirconium oxychloride ($ZrOCl_2 \cdot 8H_2O$). The zirconium silicate particles preferably lie in the range of up to about 10 microns, with about 90% lying in the range of up to about 5 microns particle size. Preferably, the zirconium dioxide particles lie in the range of up to about 2 microns particle size, with substantially all being less than about 1 micron in diameter.

The $ZrSiO_4$ provides the bulk of the polishing agent composition, with minor amounts (i.e., no more than about 10% each) of the $ZrO_2$ and $ZrOCl_2 \cdot 8H_2O$ being provided. An optimal agent mixture comprises $ZrSiO_4$, $ZrO_2$, and $ZrOCl_2 \cdot 8H_2O$ in 48:1:1 weight ratios (i.e., 96% $ZrSiO_4$; 2% $ZrO_2$; and 2% $ZrOCl_2 \cdot 8H_2O$).

The foregoing polishing agents may, by way of example, be provided in a denture cleanser composition at a level of about 20–90% by weight of the cleanser composition. Through the use of the polishing agents of the present invention, the difficulties experienced with prior art acrylic polishing compositions may be overcome, and agents of the present invention may be used to formulate compositions having superior polishing capabilities.

DESCRIPTION OF THE PREFERRED EMBODIMENTS

In accordance with the subject invention, it has been found that optimal polishing characteristics for an acrylic polishing composition are exhibited through the use of a mixture of a major amount of zirconium silicate ($ZrSiO_4$) having particles in the range of up to about 10 microns, with at least about 90% of the particles lying in the range of up to about 5 microns and minor amounts of micronized zirconium dioxide ($ZrO_2$) having particles in the range of up to about 2 microns particle size, with substantially all of the particles being less than 1 micron particle size, and zirconium oxychloride ($ZrOCl_2 \cdot 8H_2O$).

Such mixtures should comprise at least about 80%, preferably at least about 90%, $ZrSiO_4$, and up to about 10% each micronized $ZrO_2$ and $ZrOCl_2 \cdot 8H_2O$. Preferably about 2% each of the $ZrO_2$ and $ZrOCl_2 \cdot 8H_2O$ should be employed.

Where such a polishing component is used in a denture cleanser, it is preferably present in the cleanser at a level of about 20–90% by weight of the cleanser.

The size of particles in polishing compositions can be expressed in a number of ways, one of the most common of which is "mean diameter," i.e., the average diameter of a particle (as determined by appropriate measurement such as by a floatation process, by electron diffraction comparison with known styrene balls, or by light microscopy techniques), with the number of such particles in each given diameter range being expressed on a weight percentage basis. As hereinafter utilized, the term "particle size" refers to such a mean diameter value.

The preparation of suitable particle size zirconium silicate can be accomplished by conventional techniques well known to the art. Basically, these techniques involve milling zirconium silicate ore (zircon), followed by standard screen sieving (or air separation) to segregate the desired particle size. Various milling techniques may be utilized in order to obtain the desired surface configurations for the zirconium silicate particles. Particles may be prepared by a ball milling technique. Preferably the polishing agent of the present invention comprises a mixture of ball milled and hammer milled particles.

As is well known to the art, hammer mills utilize a high speed rotary shaft having a plurality of hammers or beaters mounted thereon. The hammers may be T-shaped elements, bars, or rings fixed or pivoted to the shaft or to discs pivoted to the shaft. The shaft runs in a housing containing grinding plates or liners. The grinding action results from the impact between the material being milled and the moving hammers. When zircon ore is milled by an attrition technique, such as hammer milling, relatively rough, jagged particles are produced. Particles having such a jagged surface configuration function from a denture cleaning standpoint in a relatively superior manner as compared to more smoothly configured particles.

Similarly, a ball mill comprises a cylindrical or conical shell rotating on a horizontal axis which is charged with a grinding medium such as balls of steel, flint, or porcelain. The grinding is accomplished by the tumbling action of the balls on the material to be ground. Particles of zirconium silicate treated in a ball mill of the character described have relatively smooth surface configurations and function better from a polishing standpoint than more jaggedly configured particles.

As previously noted, the zirconium silicate utilized in accordance with the present invention has particles lying in the range of up to about 10 microns, with at least about 90% of the particles lying in the range of up to about 5 microns.

Zirconium dioxide, $ZrO_2$, may be obtained by the same well known milling and sieving techniques, with the particles lying in the range of up to about 2 microns particle size. Preferably, the $ZrO_2$ particles are micronized, that is, they are substantially all (i.e., at least about 90%) less than 1 micron particle size, such particles being capable of imparting a high degree of polish to the surface to be treated.

The polishing agents of the present invention comprise relative proportions of $ZrSiO_4$, $ZrO_2$, and

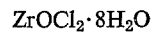

within the range of about 0.1 up to about 10.0% each of $ZrO_2$ and $ZrOCl_2 \cdot 8H_2O$, a composition comprising a 48:1:1 weight mixture of $ZrSiO_4:ZrO_2:ZrOCl_2 \cdot 8H_2O$ being especially preferred. Of course, other polishing agents may be substituted for a portion of the $ZrSiO_4$ component, although in accordance with the preferred version of this invention such other polishing agents should not be present.

The zirconium oxychloride is of course a readily available chemical compound, and, since it is water soluble, the particular form (i.e., particle size) in which it is provided does not appear to be critical.

The zirconium silicate ($ZrSiO_4$), zirconium dioxide ($ZrO_2$), and zirconium oxychloride ($ZrOCl_2 \cdot 8H_2O$) polishing agents of the present invention are generally employed in acrylic polishing preparations (such as a denture cleanser preparation) within the range of from about 20% up to about 90% by weight, depending on the particular formulation desired, as is well known to one skilled in the art. Acrylic polishing preparations in paste form preferably contain a total of about 20–70% polishing agent by weight, whereas preparations in powder form preferably contain about 60–90% polishing agent by weight.

Acrylic polishing preparations utilizing the polishing agents of the subject invention are prepared in a conventional manner and will usually include additional ingredients which render the over-all composition commercially acceptable to consumers.

More specifically, a denture cleanser acrylic polishing paste generally requires a binder substance to impart desired textural properties. Natural gum binders such as gum tragacanth, gum karaya, gum arabic, etc.; seaweed derivatives such as Irish moss and alginates; and water-soluble cellulose derivatives, such as hydroxyethyl cellulose and sodium carboxymethyl cellulose can be used for this purpose. Improvements in texture can also be attained by including an additional material such as colloidal magnesium aluminum silicate.

Thickening agents in an amount from 0.5 to 5.0% by weight can be used to form a satisfactory denture paste. Such pastes also conveniently contain sudsing agents. Suitable sudsing agents include, but are not limited to, water-soluble alkyl sulfates having 8 to 18 carbon atoms in the alkyl radical such as sodium lauryl sulfate, water-soluble salts of sulfonated monoglycerides of fatty acids having from 10 to 18 carbon atoms in the alkyl radical such as sodium coconut monoglyceride sulfonate, salts of fatty acid amides of taurines such as sodium-N-methyl palmityl tauride, and salts of fatty acid esters of isethionic acid.

Sudsing agents can be used in the compositions of this invention in an amount of from about 0.5 to about 5.0% by weight of the total composition.

It is also desirable to include some humectant material in such a paste to keep it from hardening. Materials commonly used for this purpose include glycerine, sorbitol, and other polyhydric alcohols. Humectant materials may comprise up to 35% by weight of the denture paste composition.

Exemplary compositions employing the polishing agent of the present invention are given in the following example.

EXAMPLE I

| Constituent: | Parts by wt. (percent) |
|---|---|
| Zirconium silicate | 96 |
| Micronized zirconium dioxide | 2 |
| Zirconium oxychloride | 2 |

Example II shows an acrylic polishing paste produced in accordance with the present invention.

EXAMPLE II

| Constituent: | Parts by wt. (percent) |
|---|---|
| Zirconium silicate | 46 |
| Micronized zirconium dioxide | 2 |
| Zirconium oxychloride | 2 |
| Distilled water | 17 |
| Glycerine | 13 |
| Sorbitol (70% aqueous solution) | 14 |
| Sodium monoglyceride sulfonate | 1 |
| Sodium lauryl sulfate | 1 |
| Veegum (magnesium aluminum silicate) | 1 |
| Sodium carboxymethyl cellulose | 1 |
| Colorings, etc. | 2 |

Example III illustrates another acrylic polishing composition in accordance with the present invention.

EXAMPLE III

| Constituent: | Parts by wt. (percent) |
|---|---|
| Zirconium silicate | 40 |
| Micronized zirconium dioxide | 10 |
| Zirconium oxychloride | 5 |
| Distilled water | 14 |
| Glycerine | 12 |
| Sorbitol (70% aqueous solution) | 13 |
| Sodium coconut monoglyceride sulfonate | 1 |
| Sodium lauryl sulfate | 1 |
| Veegum (magnesium aluminum silicate) | 1 |
| Sodium carboxymethyl cellulose | 1 |
| Colorings, etc. | 2 |

The following example gives an exemplary denture cleanser formulation.

EXAMPLE IV

| Constituent: | Parts by wt. (percent) |
|---|---|
| Zirconium silicate | 46 |
| Micronized zirconium dioxide | 4 |
| Zirconium oxychloride | 1 |
| Distilled water | 17 |
| Glycerine | 12 |
| Sorbitol (70% aqueous solution) | 14 |
| Sodium coconut monoglyceride sulfonate | 1 |
| Sodium lauryl sulfate | 1 |
| Veegum (magnesium aluminum silicate) | 1 |
| Sodium carboxymethyl cellulose | 1 |
| Colorings, etc. | 2 |

EXPERIMENTAL EVALUATION

The superior polishing properties of the zirconium silicate and zirconium dioxide and zirconium oxychloride mixtures of the present invention have been established by applying various test abrasives to methyl methacrylate resin blocks. To carry out the procedure, ½″ square heat-cured methyl methacrylate blocks are prepared to that the surface to be polished is smooth and free from defects. The surface is then dulled with a Dedico rubber wheel mounted on a standard dental handpiece. The blocks are then positioned on a micrometer mount of a reflectometer, and an initial reflectometer reading is recorded using low beam intensity. The test compositions are mixed using 25.0 grams of abrasive and 50 ml. of an aqueous 1.0 percent carboxymethyl cellulose solution.

Thereafter, the test blocks are mounted on a toothbrushing machine, and the test composition is applied to the test surface thereof by soft toothbrushes under 150 grams tension using 1,000 double strokes. After the brushing procedure is completed, the numbered blocks are removed, thoroughly rinsed with distilled water, and blotted dry with soft absorbent tissue. The blocks are then remounted on the reflectometer, and the highest reflectance reading on any part of the surface of each block is recorded as a final reading. The difference between the average final readings and average initial readings is used as an indication of the relative polishing ability of the test agent.

Polishing scores were obtained in the foregoing manner for various compositions comprising one or more of the constituents of the present invention. These data, which are reported in Table I, demonstrate that a substantial improvement in polishing efficacy is achieved with the present invention.

TABLE I.—DATA DEMONSTRATING SUPERIOR ACRYLIC POLISHING ABILITY OF COMBINATION OF $ZrSiO_4$, $ZrO_2$, AND $ZrOCl_2 \cdot 8H_2O$

| Composition of polishing system percent [1] | | | Acrylic polishing score |
|---|---|---|---|
| $ZrSiO_4$ | $ZrO_2$ | $ZrOCl_2 \cdot 8H_2O$ | |
| 100.0 | | | 3.16 |
| 99.6 | | 0.4 | 3.39 |
| 98.0 | | 2.0 | 4.29 |
| 99.6 | 0.4 | | 3.75 |
| 98.0 | 2.0 | | 3.38 |
| 99.2 | 0.4 | 0.4 | 3.36 |
| 96.0 | 2.0 | 2.0 | 5.64 |
| 92.0 | 4.0 | 4.0 | 4.34 |
| 80.0 | 10.0 | 10.0 | 3.79 |
| [2] 97.0 | [2] 3.0 | | 3.29 |

[1] By weight of the polishing components.
[2] System representing previous application Serial No. 796,582.

While the subject invention has been described with particular reference to the utilization of zirconium silicate and zirconium dioxide agents to polish dentures and other articles formed of acrylic resin materials, it should be understood that the subject invention further comprehends the use of these agents to polish, not only dentures formed of other materials, but also other articles formed of other similar plastics.

What is claimed is:

1. A polishing composition for acrylic materials consisting essentially of a major amount of zirconium silicate, $ZrSiO_4$, and minor amounts of micronized zirconium dioxide, $ZrO_2$, and zirconium oxychloride, $ZrOCl_2 \cdot 8H_2O$, "the said mixture comprising about 0.1–10% each of zirconium dioxide and zirconium oxychloride and the balance zirconium silicate."

2. A composition, as claimed in claim 1, wherein the zirconium silicate particles substantially all lie in the range of up to about 10 microns particle size and the zirconium dioxide particles substantially all lie in the range of up to about 2 microns particle size.

3. A composition, as claimed in claim 2, wherein at least 90% of the zirconium silicate particles lie in the range of up to about 5 microns particle size and at least 90% of the zirconium dioxide particles lie in the range of up to about 1 micron particle size.

4. A composition, as claimed in claim 3, wherein the mixture comprises about 2–4% by weight each of zirconium dioxide and zirconium oxychloride.

5. A composition, as claimed in claim 4, wherein the composition comprises substantially equal parts by weight of zirconium dioxide and zirconium oxychloride.

6. An acrylic polishing composition suitable for polishing acrylic resin materials consisting essentially of a polishing agent consisting essentially of 0.1 up to about 10.0% each zirconium dioxide, $ZrO_2$, and zirconium oxychloride, $ZrOCl_2 \cdot 8H_2O$, by weight of the agent, the zirconium dioxide having particles lying in the range of up to about 2 microns particle size and at least 80% by weight of the agent of zirconium silicate, $ZrSiO_4$, having particles lying in the range of up to about 10 microns particle size, the said agent being present in the denture cleanser composition at a level of about 20–90% by weight of the composition.

7. A composition, as claimed in claim 6, wherein at least 90% of the zirconium silicate particles lie in the range of up to about 5 microns particle size and at least 90% of the zirconium dioxide particles lie in the range of up to about 1 micron particle size, the said agent comprising about 2–4% each of zirconium dioxide and zirconium oxychloride and balance zirconium silicate.

8. A composition, as claimed in claim 7, wherein the agent contains equal parts by weight of zirconium dioxide and zirconium oxychloride.

References Cited

UNITED STATES PATENTS

| 2,427,799 | 9/1947 | Maloney | 51—308 |
| 3,071,445 | 1/1963 | Harmon et al. | 51—308 |
| 3,151,027 | 9/1964 | Cooley et al. | 424—49 |
| 3,257,282 | 6/1966 | Muhler | 424—52 |
| 3,330,732 | 7/1967 | Muhler | 424—49 |
| 3,378,445 | 4/1968 | Muhler | 424—49 |
| 3,450,813 | 6/1969 | Muhler | 424—49 |

LEON D. ROSDOL, Primary Examiner

W. E. SCHULZ, Assistant Examiner

U.S. Cl. X.R.

51—308; 106—35; 252—89; 424—49